W. L. & T. Winans.
Screw Propeller.

№ 58,744. Patented Oct. 9, 1866.

Witnesses

Inventor
W. S. Winans
Tho. Winans
Per Munn & Co Attorneys

W. L. & T. Winans.
Screw Propeller.
N° 58,744.  Patented Oct. 9, 1866.
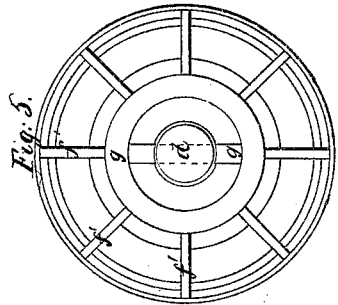
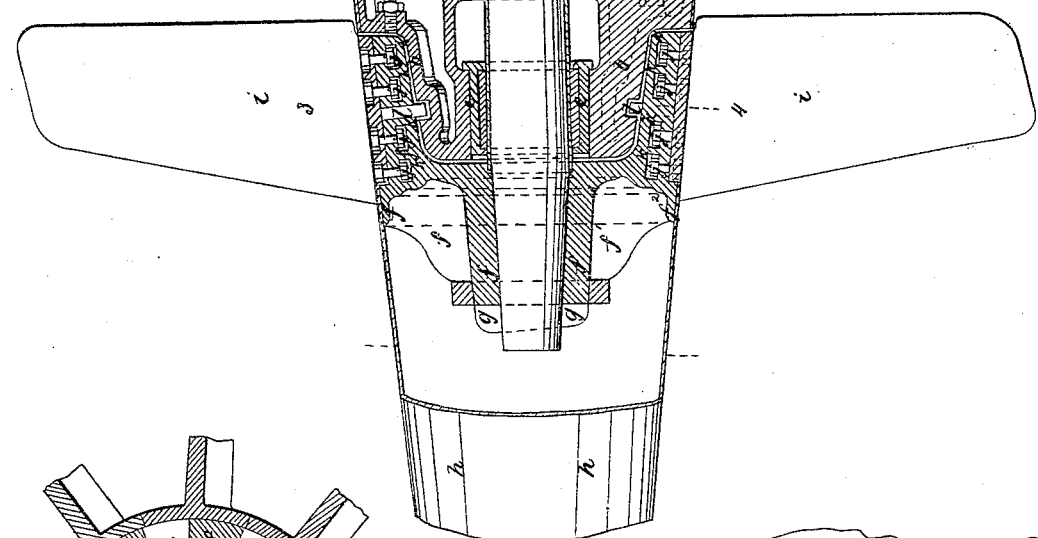
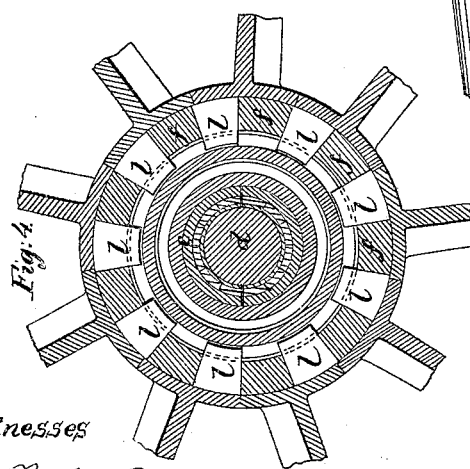
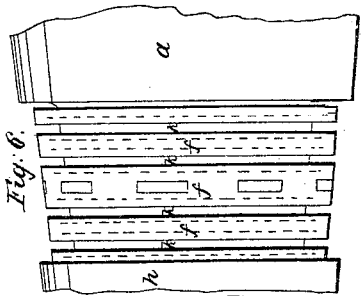
Witnesses
Inventors W. L. & T. Winans.
Screw Propeller.
N° 58,744.    Patented Oct. 9, 1866.
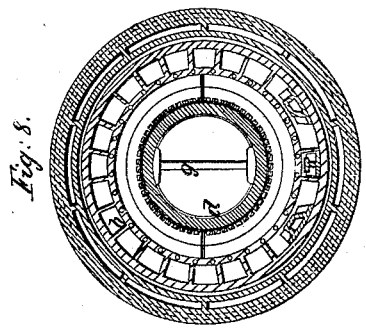
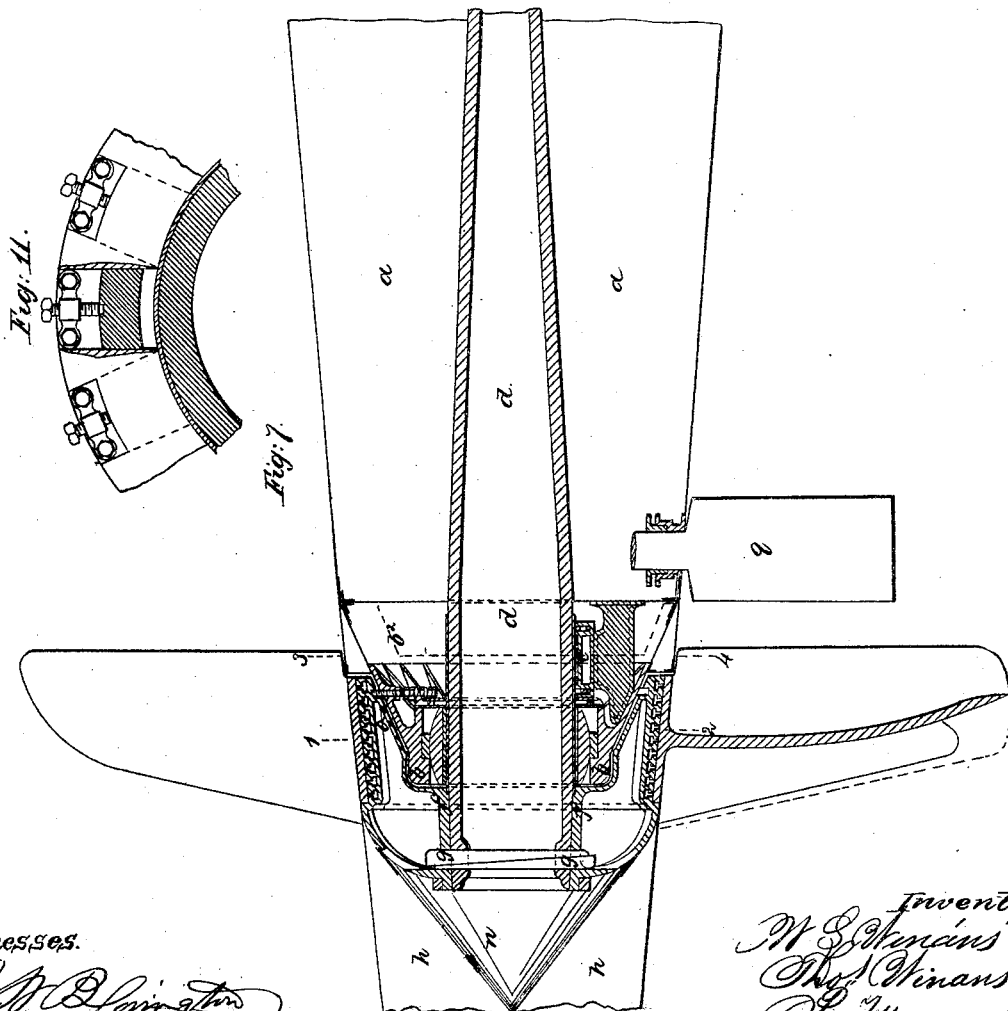

W. L. & T. Winans.
Screw Propeller.
Nº 58,744.                        Patented Oct. 9, 1866.
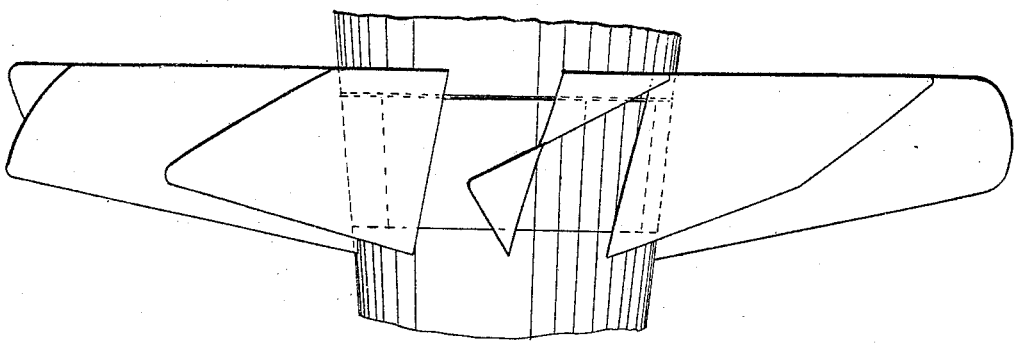
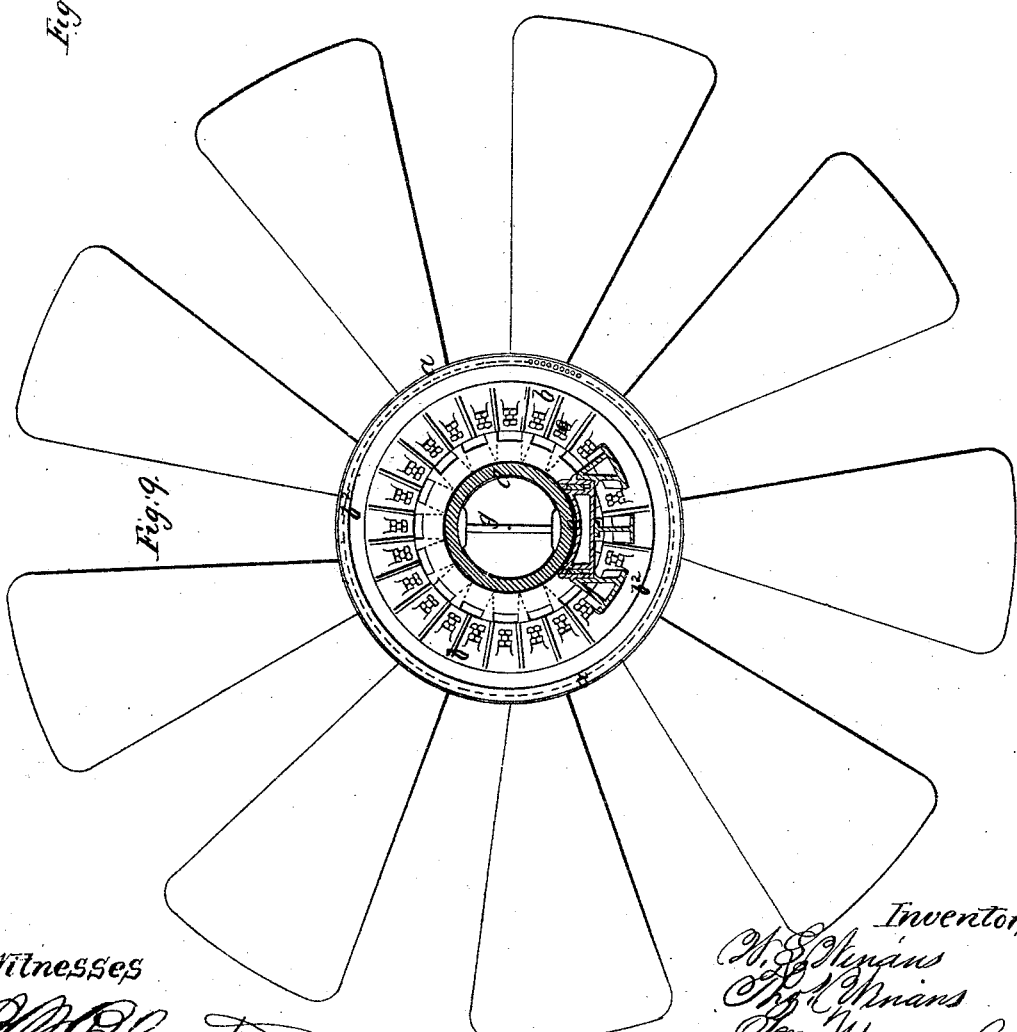

UNITED STATES PATENT OFFICE.

WILLIAM LOUIS WINANS, OF LONDON, ENGLAND, AND THOMAS WINANS, OF BALTIMORE, MARYLAND.

IMPROVED PROPELLER.

Specification forming part of Letters Patent No. 58,744, dated October 9, 1866.

*To all whom it may concern:*

Be it known that we, WILLIAM LOUIS WINANS, of London, England, and THOMAS WINANS, of Baltimore, United States of America, have invented Improvements in Adapting Propellers for Propelling Ships or Vessels for Ocean Navigation; and we do hereby declare that the following is a full and exact description of our said invention.

Our invention of improvements in adapting propellers for propelling ships or vessels for ocean navigation consists in the adaptation to and combination with a spindle-shaped hull, such as was invented by Ross and Thomas Winans and patented 26th October, 1858, No. 21,917, of a screw-propeller placed at one end of the vessel, or two screw-propellers one placed at each end of the vessel.

It likewise consists in the adaptation and combination of like propellers to a spindle-shaped hull, in combination with a flat, or nearly flat, upper deck with bulwarks, railing, or cabin similar to that invented by us, and for which we have applied for Letters Patent.

The longitudinal center line of the shafts of these propellers coincides, or nearly so, with the center line or longitudinal axis of the vessel, so that one-half, or nearly one-half, of the propeller or propellers will be out of the water.

The external surface of one end of the hub of the propeller corresponds with the outside diameter of the end of the hull of the vessel, and the other end of the hub is continued to a point, thereby completing the spindle form of the vessel.

In the accompanying drawings we have shown various views of two different modes of applying our invention.

Figure 2:
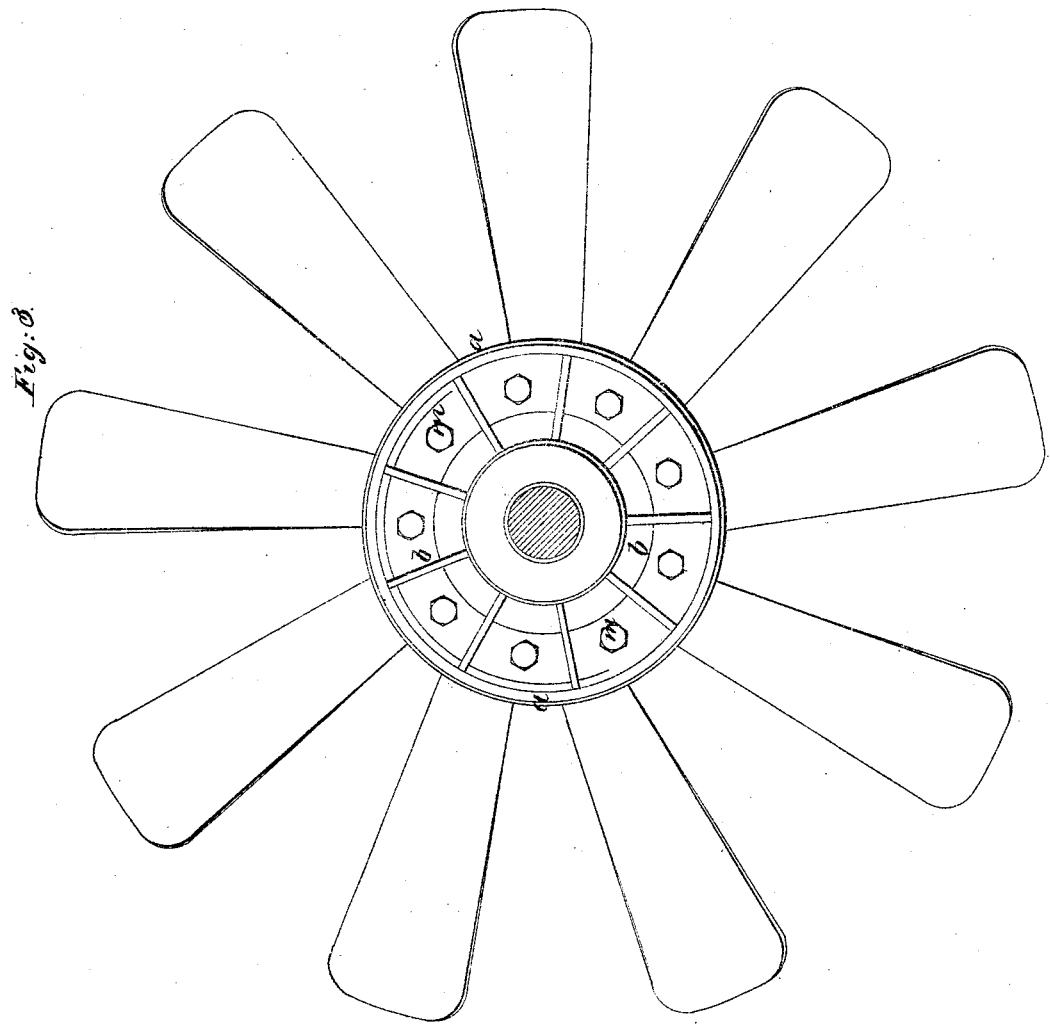
Figure 1:
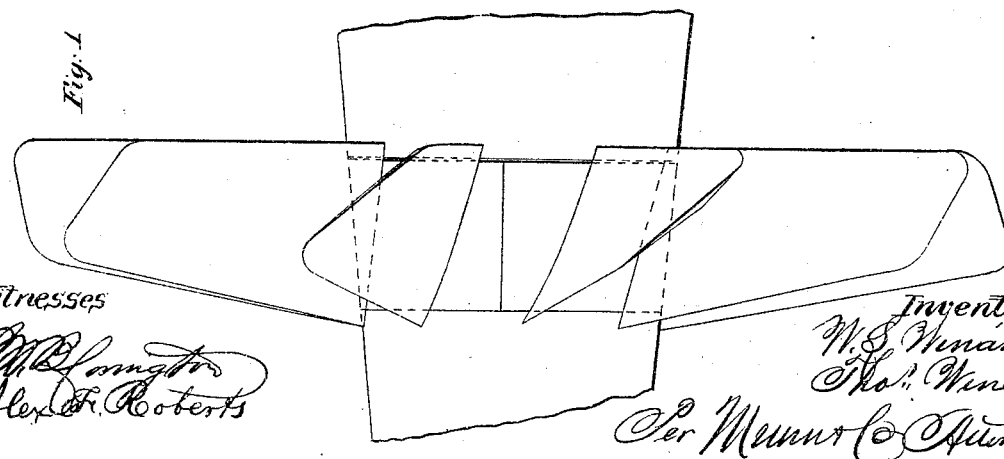

Figure 1, Sheet I, is an elevation of part of a conical or spindle-shaped vessel with the present improvements adapted thereto. Fig. 2, Sheet II, is a longitudinal vertical section of the same, showing the manner of securing the propeller on the propeller-shaft. Fig. 3, Sheet I, is a cross-section, taken in the line 1 2 of Fig. 2, and looking toward the left. Fig. 4 is another cross-section, taken in the line 3 4, and looking in the same direction. Fig. 5 is an end view of the propeller shaft and hub, looking toward the right. Fig. 6 is a plan view of part of the vessel, showing the external view of the hub of the propeller-shaft, but with the propelling arms or vanes removed.

All the figures in Sheets I and II represent parts of a vessel of moderate dimensions; but the figures in Sheets III and IV, hereinafter referred to, represent different views of parts of a vessel of a large class.

In Figs. 1, 2, and 3, $a\ a$ is the main body of the vessel, the end of which is closed by a strong cast-iron cover, $b\ b$, Fig. 2, in which is placed the bearing $c$, to receive and support the propeller-shaft $d$, which, in this instance, is made solid, but, if preferred, may be made hollow. This shaft $d$ also passes through a stuffing-box, $e$, and carries at one end a strong cast-iron hub, $f\ f$, which is secured thereon by a ring and keys or collars $g$.

The hub is strengthened by webs $f^1\ f^1$, and is provided with a circular flange, $f^2\ f^2$, onto which is riveted or otherwise secured the conical or pointed projection $h$ of the propeller-hub, which forms a continuation of the lines of the vessel.

The propelling-blades $i\ i\ i$ are secured on the hub $f$ by means of screw bolts and nuts $j$ $j$, Fig. 2, the heads of which are inserted in countersunk slots or grooves $k\ k$ cut in the hub, as seen in Figs. 2 and 6.

In Figs. 2 and 4, $l\ l$ are feathers secured in the inner face of the hub $f\ f$, and projecting inward radially toward the center. These projecting feathers $l$ enter and work in an annular groove, $b^1$, made round the casting $b$, so that should the end of the shaft $d$ become broken off by accident, the feathers $l$ will prevent the broken part from falling away.

The hub and the parts connected with it may be jammed tight and temporarily secured by screwing up the tightening-screws $m\ m$ behind.

Fig. 7, Sheet III, is a longitudinal vertical section of a modification of the arrangement shown in Sheets I and II, and is adapted for vessels of large size. Fig. 8 is a transverse vertical section, taken in the line 1 2 of Fig. 7. Fig. 9, Sheet IV, is another transverse section, taken in the line 3 4 of Fig. 7. Fig. 10 is an elevation of the propeller mounted on its hub and adapted to the vessel. Fig. 11, Sheet III, is a detached view, drawn on an enlarged scale, of the mode we prefer to adopt for packing the propeller-shaft.

$a$ is the main body of the vessel, the end of which is closed by the cast-iron cap or cover $b$, in combination with the wrought-iron plates $b^2 \, b^2$.

The bearing $c$ is of peculiar form and construction, as shown in the drawings, and receives the hollow shaft $d$, to the outer end of which the hub $f$ is secured by keys or collars $g$, as in the former instance.

The conical-pointed or projecting end $h$ of the hub of the propeller is made of such form and dimensions as to continue the lines of the vessel to a point; but as the shaft $d$ in this instance is hollow a wrought-iron conical cap or cover, $n$ $n$, is secured to the hub as a bulk-head, and for greater security this bulk-head is made of a conical form, so as to cause less obstruction to the movement of the vessel in case the outer cone should be accidentally broken off.

The propeller blades or arms are secured to the hub in the same manner as in the former instance; but instead of the projecting feathers $l \, l$, (shown in Fig. 2,) a number of screw-bolts, $o \, o$, are arranged radially round the inside of the cast-iron cap-piece $b \, b$, and their outer ends are made to project therefrom and enter a groove cut in the inside of the hub, as seen at $p \, p$. By this means, should the end of the propeller-shaft be broken off by accident, it would be prevented from falling away from the vessel and becoming lost.

When one propeller only is used a rudder, $q$, is placed immediately in rear of the propeller, as shown, and another one is placed at the other end of the vessel at about an equal distance from the end.

When two propellers are used a rudder, $q$, is placed immediately in rear of the front propeller, and another one is placed forward of the after propeller.

The spindle or shaft of the rudder passes up through the bottom of the vessel and through a stuffing-box, $r$, and to the upper end of the spindle is adapted a double-armed or forked lever, (not shown in the drawings,) which embraces the propeller-shaft $d$, and serves to maneuver the rudder by means of the ordinary steering-gear.

The rudder not only serves to guide or steer the vessel, but also acts as a fin to prevent the water from being carried round by the action of the propeller.

We sometimes make in lieu of this rudder a fixture to act simply as a fin, for the purpose above explained, the steering-rudder being placed at some other convenient part of the vessel.

For vessels in which the two propellers are used, one propeller is placed at each end of the vessel; but as both propellers are constructed alike, and the projections of the hubs will be continued in a line to a point, we have not considered it necessary to show more than one.

When one propeller only is used, we would prefer, for greater facility of steering, that it should be placed on the forward end of the vessel, with one of the rudders of large size a short distance in rear of the propeller, as shown in the drawings, in order to partially counteract the tendency of the vessel to move laterally by the action of the propeller.

By these improvements more propelling-surface of blades and a greater pitch of propeller can be obtained than is usual at the present time on steam-vessels with screw-propellers of the ordinary construction, and therefore greater speed than usual can be obtained.

By "ocean navigation" we mean in this specification all navigation excepting that upon rivers, canals, and lakes.

Having now described our invention of improvements in adapting propellers for propelling ships or vessels for ocean navigation, and having explained a way of carrying the same into effect, we wish it to be understood that we do not confine ourselves to any exact form or dimensions for constructing the different parts. Neither do we confine ourselves to the details herein described, so long as the peculiar character or principles of our invention be retained.

What we claim is—

1. The adaptation to and in combination with a spindle-shaped vessel, such as was invented by Ross and Thomas Winans, and for which Letters Patent were granted to them 26th October, 1858, No. 21,917, of one screw-propeller placed at one end of the vessel, with its shaft coinciding with the center line or longitudinal axis of the vessel, or nearly so, the outside diameter of the hub of the propeller at one end corresponding with the outside diameter of the end of the vessel, and the other end of the propeller-hub being continued to a point, thereby completing the spindle form of the vessel.

2. The combination of the flanged hub $f$, shaft $d$, webs $f \, f^1$, projection $h$, propelling-blades $i$, and feathers $l \, l$, arranged with the grooved portion $b$ of the body $a$ of the spindle-shaped hull herein described, substantially as and for the purpose specified.

In witness whereof we, the said WILLIAM LOUIS WINANS and THOMAS WINANS, have hereunto set our hands and seals this 20th day of January, 1866.

WM. L. WINANS. [L. S.]
  THOMAS WINANS. [L. S.]

Witnesses:
 OSMAN LATROBE,
  45 *Clarges St., London.*
 T. H. HAMBLETON,
  45 *Clarges St., London.*